Oct. 8, 1963 A. KOLLER 3,106,127
DEVICE FOR THE ALIGNMENT AND READING OF DISTANCES AND ANGLES
Filed April 8, 1958 7 Sheets-Sheet 1

INVENTOR
AUGUST KOLLER
BY
ATTORNEY

Oct. 8, 1963   A. KOLLER   3,106,127
DEVICE FOR THE ALIGNMENT AND READING OF DISTANCES AND ANGLES
Filed April 8, 1958   7 Sheets-Sheet 4
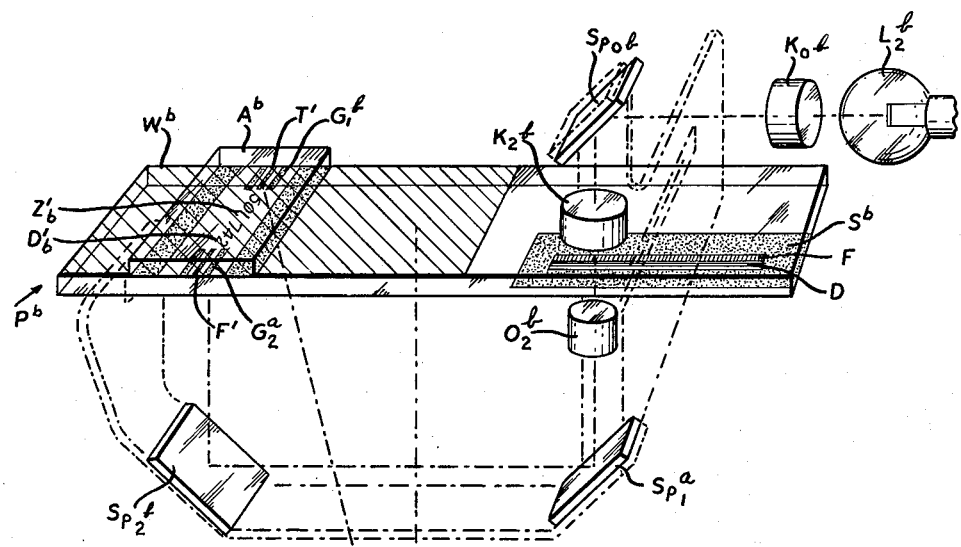
FIG. 6.
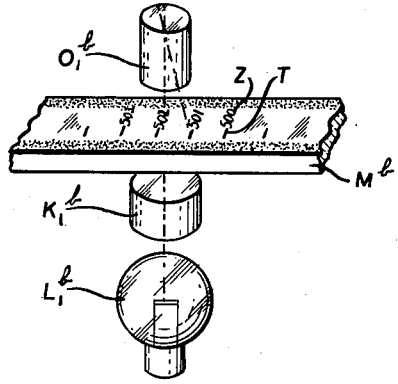
INVENTOR
AUGUST KOLLER
BY
ATTORNEY Oct. 8, 1963 A. KOLLER 3,106,127
DEVICE FOR THE ALIGNMENT AND READING OF DISTANCES AND ANGLES
Filed April 8, 1958 7 Sheets-Sheet 5

INVENTOR
AUGUST KOLLER
BY
ATTORNEY

INVENTOR
AUGUST KOLLER
BY
ATTORNEY

# United States Patent Office 3,106,127
Patented Oct. 8, 1963

3,106,127
DEVICE FOR THE ALIGNMENT AND READING
OF DISTANCES AND ANGLES
August Koller, Traunreut, Upper Bavaria, Germany,
assignor to Dr. Johannes Heidenhain Feinmechanik
und Optik, Prazisionsteilungen, Traunreut uber Traunstein, Germany
Filed Apr. 8, 1958, Ser. No. 727,097
Claims priority, application Germany Apr. 11, 1957
3 Claims. (Cl. 88—24)

The present invention relates to a device for the alignment and reading of distances and angles.

It is known to use reading microscopes in connection with ocular-screw-micrometers or oculars with spiral measuring plates for the reading and alignment of pitches, as for instance length scales, circular pitches, etc. It is also known to use transverse scales for the reading and aligning of such pitches. In accordance with a further known arrangement, a fine scale disposed intermediate the reading ray flow is used for the reading of the first pitch step and a circular scale is used for the reading of the second and third pitch step. All these arrangements have the common decisive drawback, that the reading value does not appear directly as a number. Rather measuring pitches, as transverse measuring fields, length scales, circular scales appear in the reading field, so that the measuring value and alignment value, respectively, is arrived at only upon complicated, successive reading or alignment of a plurality of measuring scales. The reading is then made still more difficult due to the fact that not all scale lines of these measuring scales can be equipped with numbers for technical reasons in the known devices. The reading of such measuring devices is, therefore, for the stated reasons, not only complicated and time consuming, but leads also to errors or mistakes.

It is, therefore, one object of the present invention to provide a device wherein the measuring and alignment values appear directly in numbers with complete measuring exactness. It is, thus, for instance, possible to receive numbers of a millimeter-scale for the reading and aligning values, respectively, which numbers reflect in a natural decimal arrangement in addition to the total millimeter values, the tenth, the hundredth and the thousandths of a millimeter.

With this and other objects in view which will become apparent in the following detailed description, the present invention will be clearly understood in connection with the accompanying drawings, in which:

FIG. 6 is a schematic, perspective front view of a variation of the embodiment disclosed in FIG. 5;

Figure 1:
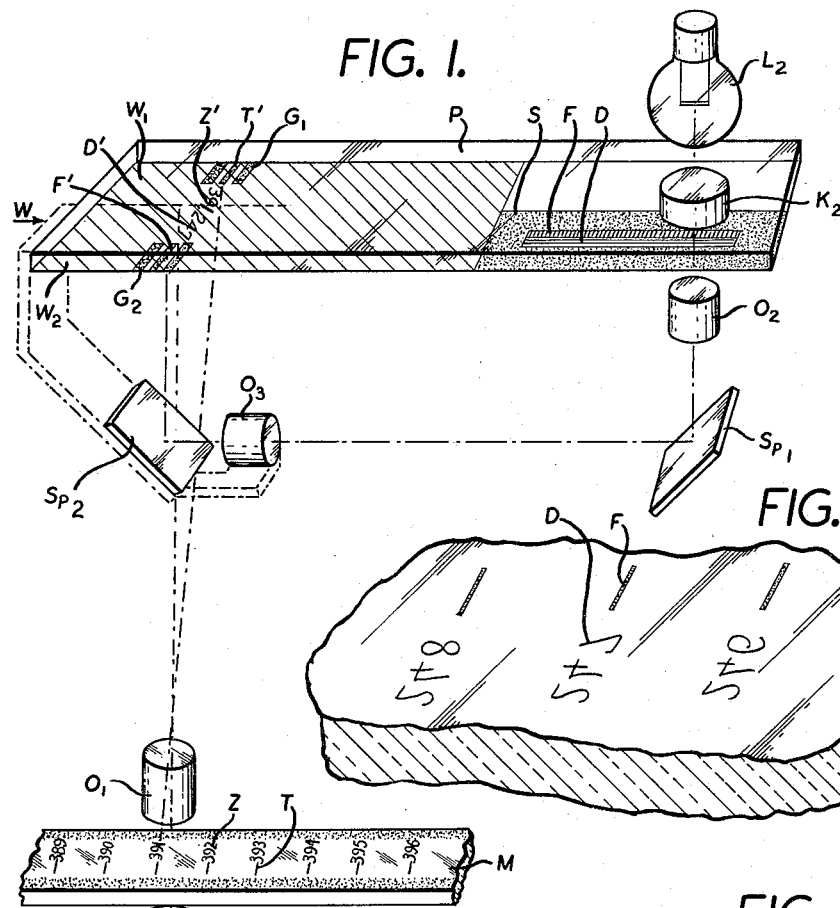
FIGURE 1 is a schematic, perspective front view of the device designed in accordance with the present invention.

Referring now to the drawings, and in particular to FIG. 1, it is a characteristic feature of the embodiment disclosed in FIG. 1, as well as of the other embodiments referred to below, that two separate sets of rays are provided. Furthermore, a first member is provided which is adjustable relative to the device and which carries a scale M to be aligned and to be read, respectively, and also a second member is arranged which is adjustable relative to the device and carries a fine scale S.

An objective $O_1$ is disposed above the member carrying the scale M and a lamp $L_1$ is arranged below said member to light up the scale M with the assistance of the condenser $K_1$. In the first ray set, the objective $O_1$ throws an image $T^1$ of the scale line T of the scale M and an image $Z_1$ of the number Z of the scale line T onto a screen $W_1$ forming a part of the device, from the scale M to be aligned and to be read, respectively. The screen $W_1$ is equipped with an alignment mark $G_1$ for the alignment and setting, respectively, of the scale line images $T^1$.

The device comprises a second objective $O_2$ and a third objective $O_3$. The fine scale S receives its light from the lamp $L_2$ which operates with the assistance of the condenser $K_2$. Furthermore, the mirrors $Sp_1$ and $Sp_2$ are coordinated to the respective objectives $O_2$ and $O_3$.

In the second ray set, the objective $O_2$ jointly with the objective $O_3$ projects an image $F^1$ of a scale line F of the fine scale S and an image $D^1$ of the number D assigned to the scale line F onto the screen $W_2$ from the fine scale S. The screen $W_2$ is equipped with an alignment mark $G_2$ for the image $F^1$ of the scale line F and forms jointly with the screen $W_1$ an integral screen W.

The first ray set adapted for the projection of the scale M to be aligned and read is disposed throughout at the penetration point of its optical axis on the scale M. In the second ray set adapted for the projection of the fine scale, only that portion disposed between the mirror $Sp_2$ and the screen $W_2$, which projects the fine scale S perpendicularly onto the screen $W_2$, is adjustable in the direction towards the fine scale S. The second member carrying the fine scale S and the screens $W_1$ and $W_2$ are arranged on a plate P of transparent material, as of glass, the bottom face of which carries the scale lines F and the numbers D of the fine scale S, as well as the alignment marks $G_1$ and $G_2$ and the screens $W_1$ and $W_2$, which are formed by a joint opaque portion of the glass plate P.

The mirror $Sp_2$ and the objective $O_3$ are rigidly connected with the plate P by any conventional suitable means (not shown). By this arrangement, the image of the fine scale S will always appear sharply adjacent the alignment mark $G_2$. The division of the fine scale S is oriented in such a manner, that its direction coincides with that of the image thereof. The plate P is adjustable in the direction and in the plane of the fine scale for a length, which is at least equal to the interval of the picture of the scale S. The division of the fine scale S is of a length which is exactly equal with the length of the interval of the image of the fine scale S.

In order to make a reading, that is in order to read a scale line of the scale to be aligned and read, respectively, and to adjust the position of the scale S relative to the device, the following steps are taken:

All of the elements, namely $L_1$, $K_1$, $O_1$, $Sp_1$, $L_2$, $K_2$, $O_2$, W, P, $G_1$, $G_2$, S, $Sp_2$ and $O_3$, except the main scale M, are initially moved as a unit with respect to the main scale B by any suitable means (not shown) and then, assuming a slight misalignment of image $T_1$ with respect to $G_1$, the carrier W, P, $G_1$, $G_2$, S, $Sp_2$ and the objective $O_3$ are moved, independently of the other elements mentioned above, in order to bring the image T' into proper register with the alignment marker $G_1$ and, thereby, give a vernier reading due to the relative movement of the fine scale S with respect to the ray axis derived from the fine scale optical system.

If thus the screen W and with it the fine scale S is moved by any suitable means (not shown) until the scale line image $T^1$ appears in proper register with the alignment mark $G_1$, then, the number image $Z^1$ gives the total interval units and the number image $D^1$ the interval parts of the scale to be aligned and to be read in form of numbers, provided each scale line of the scale M, as well as each scale line of the fine scale S, bears a number. The two optical systems are disposed and guided in the embodiment shown in FIG. 1 in such a manner, that at first the number of the scale M to be aligned and to be read and then the number of the fine scale S appears in readable arrangement on the screen W, whereby both numbers form jointly a single number in natural succession of the numerals.

Figure 3:
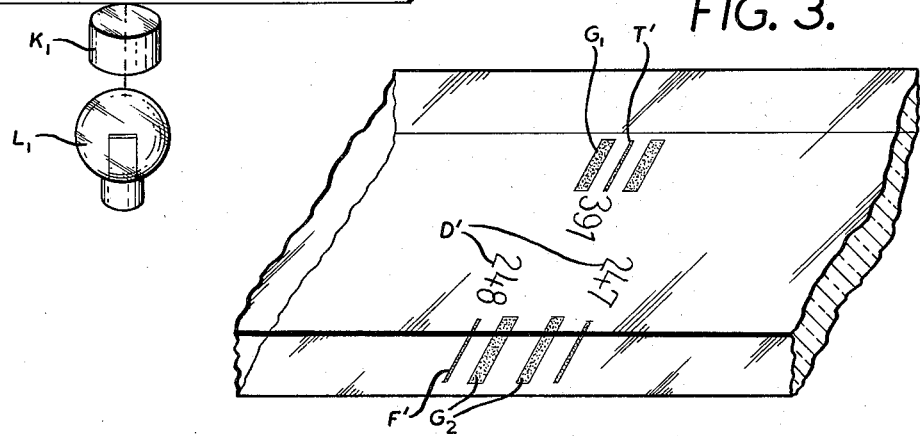
FIG. 3 is a fragmentary perspective view of the screen.

Referring now to FIG. 3 of the drawings, if two image numbers $D^1$ of the fine scale S appear within the visible sphere of the screen, the number of the corresponding image line $F^1$ of which is closer to the alignment mark $G_2$, is to be chosen.

In order to align a specific scale position relative to the device, the following steps are taken:

At first the fine scale S is moved until the scale line of the fine scale S which corresponds with the interval portion of the scale M appears in the center of the alignment mark $G_2$. If then the scale M is adjusted relative to the device until the image scale line $T^1$ of the scale line T, corresponding with the predetermined full interval values, appears in the center of the alignment mark $G_1$, the device is set for the desired value.

The interval of the fine scale S is chosen in such a manner that the scale lines of the fine scale and its numbering, respectively, render the measuring value to the full extent of the measuring exactness of the device. The number picture which appears on the screen and consists of the number $Z^1$ and $D^1$ provides directly the alignment and reading value to the full extent of the measuring exactness of the device.

The fine scale S, the length of which corresponds to the interval length of the image received from the first ray set of an interval of the scale M, is preferably divided in accordance with the decimal system and the scale M is preferably arranged in such a manner that its intervals correspond with one unit of the chosen measure system, and thus may have, for instance, the length of a millimeter or one inch, or the length corresponding with a basic unit.

If, for instance, the interval of the scale M, as assumed in the embodiment shown in FIG. 1, is one millimeter and the measuring exactness of the device is one micron, the fine scale must have one thousand intervals, the length of which is one micron. If now the interval of the scale M is projected by the first ray set with a fifty times enlargement, the interval length of the fine scale S must amount to 50 microns. The scale lines of the fine scale are then numbered continuously with the numbers 0 to 999. If further, a comma is provided on the screen at the end of the number $Z^1$, the alignment and reading value appears directly with three decimal positions.

It is to be understood, however, that a division may be provided also on the fine scale S which division corresponds with a system other than the decimal system. Thus, if the scale M is a circular scale in degrees, a fine scale S may be chosen which supplies directly the values to be read in seconds. If the measuring exactness is five arc-seconds and if the scale M is in degrees, the fine scale S must have 720 intervals and 721 scale lines. Each scale line is then provided with a numbering in minutes and seconds, whereby the values of the seconds increase for five seconds between each pair of adjacent scale lines.

In case of circular division the curvature of the latter and of its picture, respectively, can be neglected as to the adjustment and guidance of the fine scale S, since a portion of the circular division of one degree may be considered as a linear value. On the other hand, the fine scale S must be made as a circular section and must form a portion of a circle. It is still further possible to divide and to number the fine scale S in such a manner, that it supplies parts of the intervals of the scale M, as for instance one hundred twenty-eight of an inch.

Figure 2:
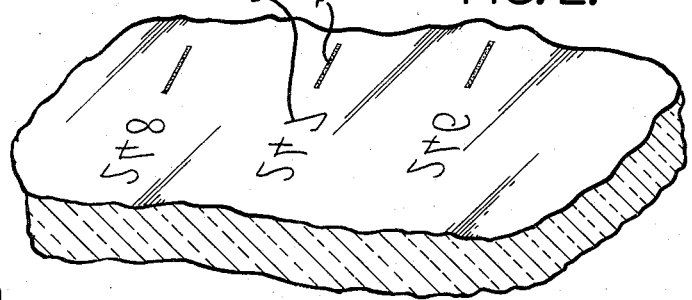
FIG. 2 is a fragmentary perspective view of the carrier of the scale.

Referring now to FIG. 2 of the drawings, which shows the carrier of the fine scale S, shown in FIG. 1, quite enlarged, the intervals of the scale M is there subdivided into microns. FIG. 2 shows schematically the scale lines 246, 247 and 248 of the fine scale S.

Preferably, the plane of the fine scale S serving as plane for the objective $O_2$ in the second ray set, the plane of the image projected by the first ray set and the plane of the image of the fine scale S projected by the second ray set coincides, preferably, with each other, as shown in FIG. 1, so that the screens $W_1$ and $W_2$ for the scale M and for the fine scale S, which screens $W_1$, $W_2$ form a joint screen W and carry the alignment marks $G_1$ and $G_2$, respectively, may be provided on the same side of a plane glass plate, the joint screen W being formed by an opaque range of the entire surface of the glass plate. It is, however, also possible, to use individual members for the carrier of the fine scale S and for the screens for the images of the scale M and of the fine scale S, which members must be rigidly interconnected. In this case, the two screens $W_1$ and $W_2$ and the fine scale S may be disposed in a common plane or in a plurality of planes parallel to each other.

As clearly shown in FIG. 1, a specific light source $L_1$ and $L_2$ is provided for each ray set.

Figure 4:
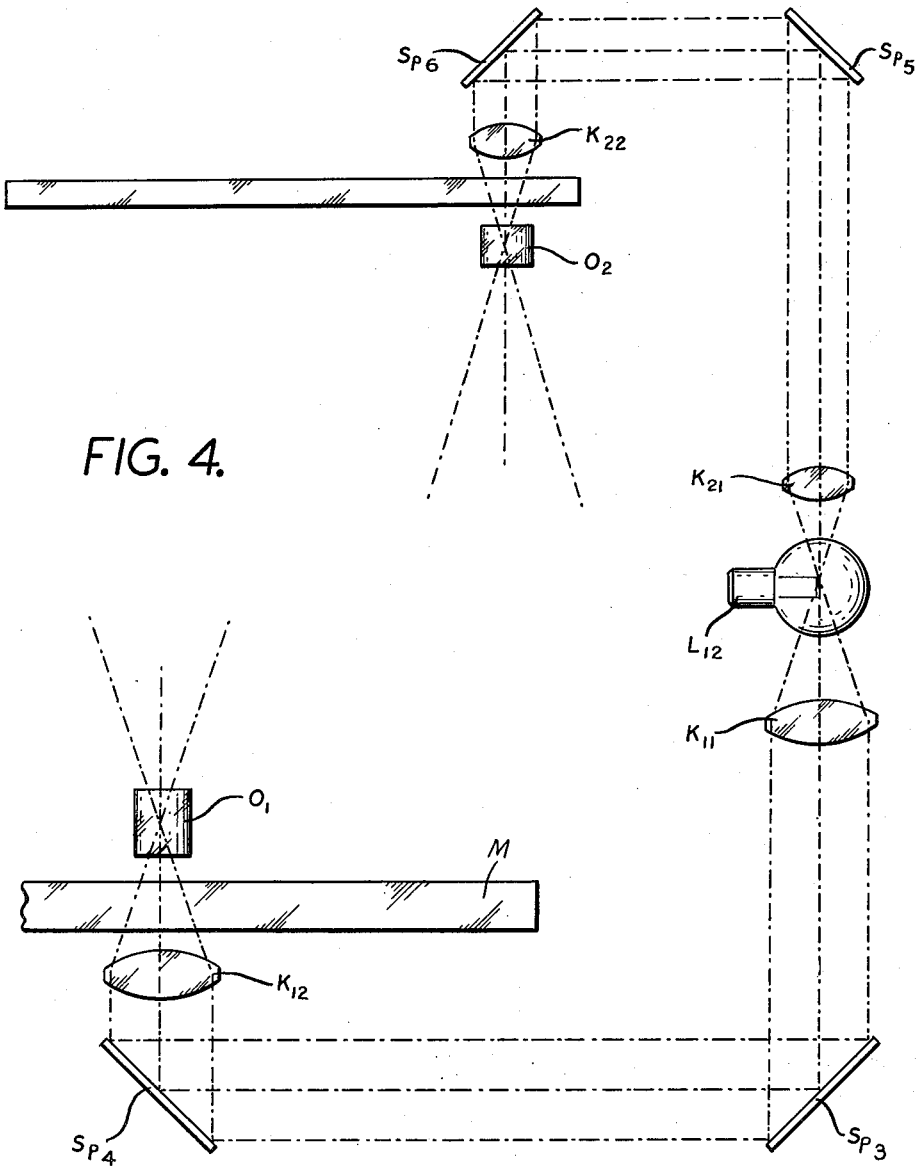
FIG. 4 is a schematic view of another embodiment of the device wherein a single light source is used for both ray sets.

Referring now to FIG. 4 of the drawings, a single light source can be provided for feeding both ray sets. The light of the lamp $L_{12}$ is fed through the condensers $K_{11}$ and $K_{12}$ by means of the mirrors $Sp_3$ and $Sp_4$ to the first ray set and through the condensers $K_{21}$ and $K_{22}$ by means of the mirrors $Sp_5$ and $Sp_6$ to the second ray set. The enlargements, which are projected from the scale M and from the fine scale S, are chosen, preferably high, as 50 to 100 times or even higher.

Figure 5:
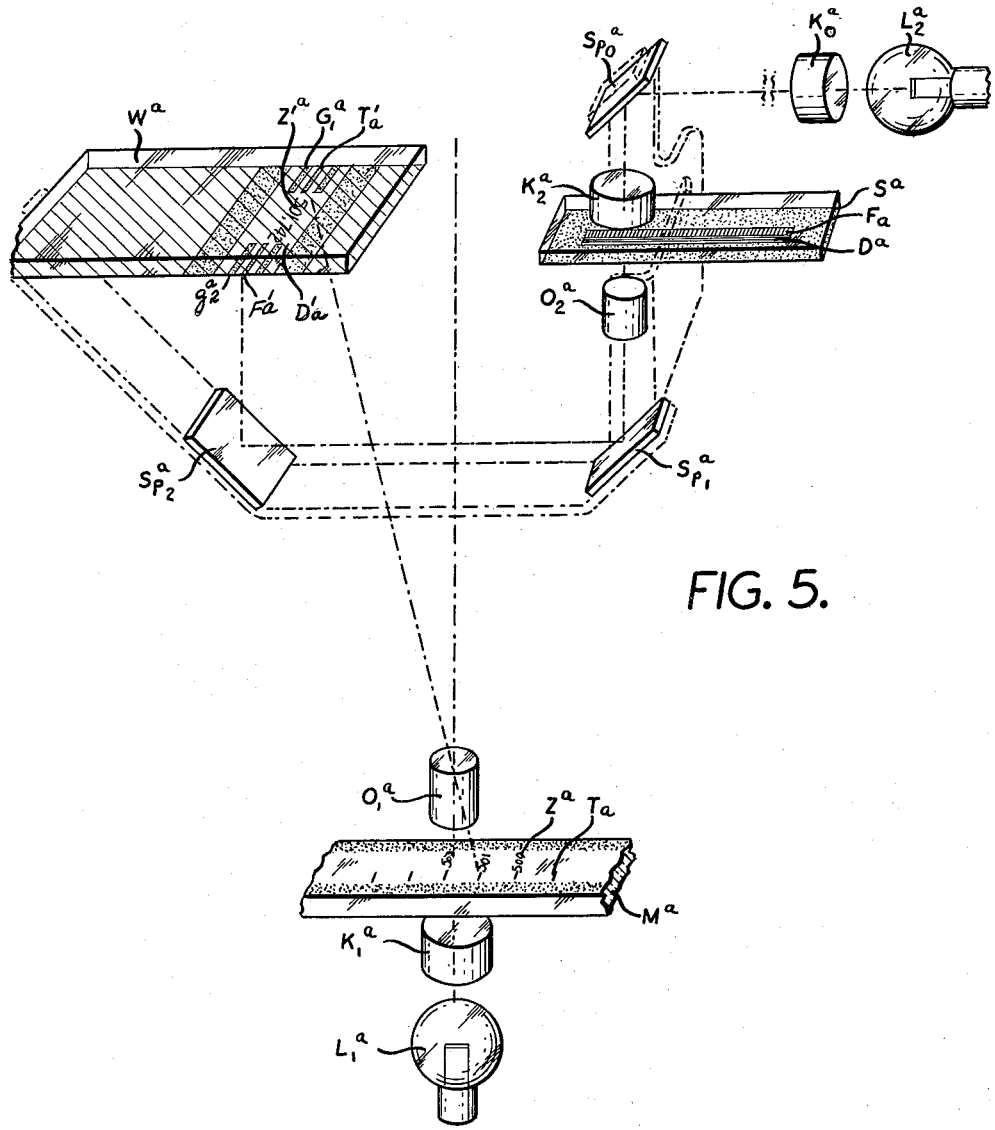
FIG. 5 is a schematic perspective front view of a third embodiment of the present device.

Referring now to FIG. 5 of the drawings, a still further embodiment of the present invention is disclosed. Substantially, this embodiment follows the embodiment disclosed in FIG. 1, since two separate ray sets, a scale $M^a$ to be aligned and to be read, respectively, and a fine scale $S^a$ are provided. The first ray set, adapted for the projection of the scale $M^a$, is disposed, as in FIG. 1, above the scale $M^a$, that means relative to the penetration point of its optical axis. It comprises, as in FIG. 1, a lamp $L_1^a$, a condenser $K_1^a$, a carrier for the adjustable and readable scale $M^a$ and the objective $O_1^a$.

The image of the scale $M^a$ is projected onto the screen $W^a$, in this embodiment, which screen $W^a$ is equipped with an alignment mark $G_1^a$ for the scale line images $T^1_a$ of the scale lines $T_a$ of the scale $M^a$. The second ray set is, however, arranged in such a manner, that its scanning point on the fine scale $S^a$ may be adjusted in the direction of the division of the fine scale $S^a$, which, contrary to the embodiment in FIG. 1, is immovably mounted. The fine scale $S^a$ receives the light from the lamp $L_2^a$ through the condensers $K_0^a$ and $K_2^a$ by means of the mirror $Sp_0^a$ and through the objective $O_2^a$ by means of the mirrors $Sp_1^a$ and $Sp_2^a$ onto the screen $W^a$, which is equipped with a second alignment mark $G_2^a$ for the images $F^1_a$ of the scale lines $F_a$ of the fine scale $S^a$. The portion of the second ray set comprising the mirror $Sp_0^a$, the condenser $K_2^a$, the objective $O_2^a$ and the mirrors $Sp_1^a$ and $Sp_2^a$ and the screen $W^a$ form a rigid unit which is adjustably or movably mounted for movement in the direction of the division of the picture of the scale $M^a$ and, thereby, also in the direction of the division of the fine scale $S^a$.

In order to read the position of a scale line of the scale $M^a$, the following steps are taken:

The rigid system comprising the mentioned elements of the second ray set and the screen $W^a$ are moved, until the image $T^1_a$ of the scale line $T_a$ lines in the center of the alignment mark $G_1^a$. The images $Z^1_a$ of the number $Z^a$ of the scale $M^a$ and the number $D^1_a$ render the desired reading value.

The alignment of the device, disclosed in FIG. 5, for a predetermined value is brought about in the same manner as that of the embodiment of FIG. 1.

The length of the fine scale $S^a$ must, as in the embodiment in FIG. 1, correspond with the length of the image of an interval of the scale $M^a$. The rigid system must then be moved for the same length relative to the fine scale $S^a$ in the direction of the division of the fine scale. As to the intervals of the fine scale $S^a$ and of the scale $M^a$, as to the numbering of the scale lines of the scale $M^a$ and of the fine scale $S^a$, and as to the arrangement of the numbers $Z^1_a$ and $D^1_a$, reference is made to the disclosure in connection with FIG. 1. In the embodiment of FIG. 5, the plane of the fine scale $S^a$, the planes of the images of the scale $M^a$ and of the fine scale $S^a$ and the screen $W^a$ are identical.

The fine scale $S^a$ and images of the scale $M^a$ and of the fine scale $S^a$ and the corresponding screens may be disposed, however, in different parallel planes. If the images of the fine scale $S^a$ and of the scale $M^a$ are disposed in different parallel planes, and two different screens are used for the respective images, the screens must be rigidly interconnected.

The two ray sets can be fed by one single light source in the embodiment of FIG. 5, instead of by two separate light sources.

Referring now to FIG. 6 of the drawings, a variation of the embodiment of FIG. 5 is disclosed. The variation resides in the fact that the glass plate $P^b$ has at its upper face an opaque, in the direction of the fine scale $S^b$ sufficiently long zone which serves as a screen $W^b$, while the fine scale $S^b$ is arranged on the bottom face of the glass plate $P^b$. The screen $W^b$ is thus provided on the same integral body which carries also the fine scale $S^b$. The two alignment marks $G_1^b$ and $G_2^b$ are here, however, not provided on the screen $W^b$, but on the bottom face of a glass plate $A^b$ which faces the screen $W^b$. The glass plate $A^b$ is rigidly connected with the movable members of the second ray set, in the embodiment of FIG. 6, instead of with the screen $W^b$.

Figure 7:
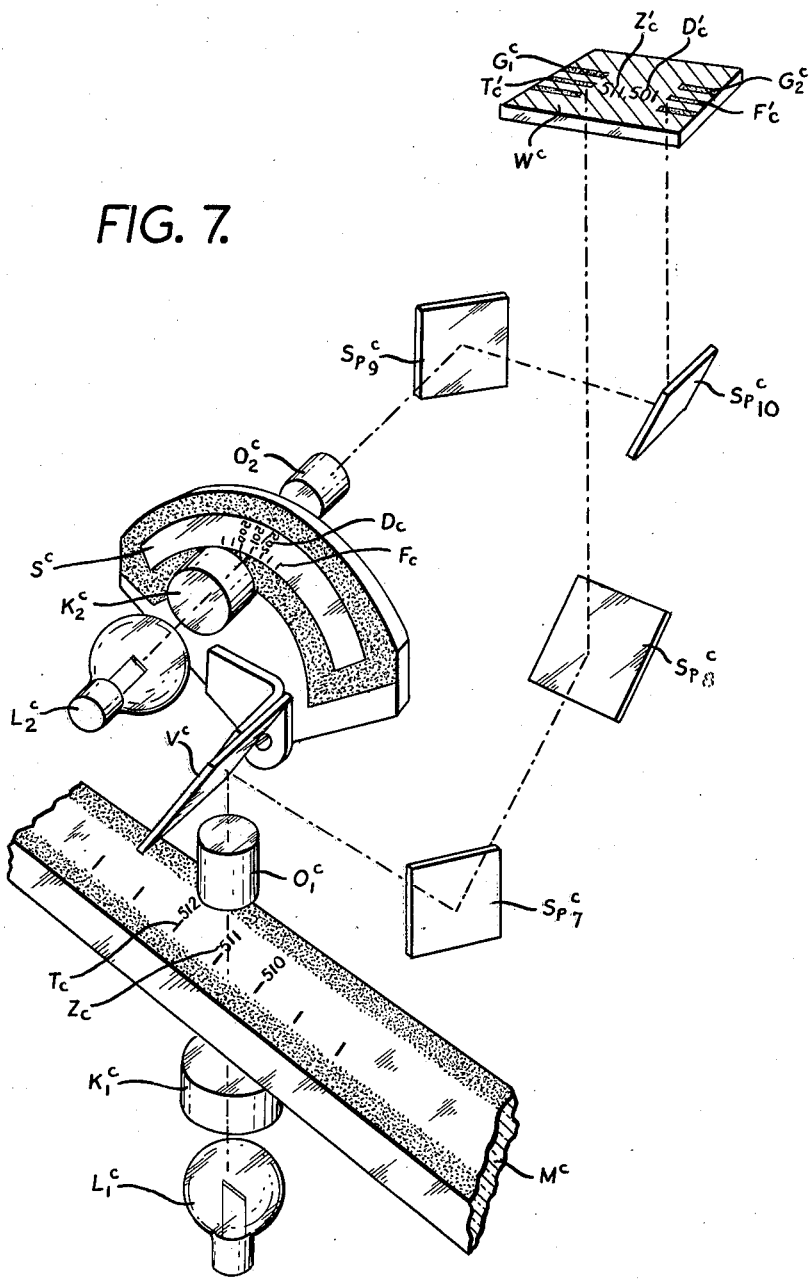
FIG. 7 is a schematic, perspective front view of a fourth embodiment of the present invention.

Referring now to FIG. 7, still another embodiment of the present invention is disclosed. Two ray sets are again provided, as well as a scale $M^c$ to be aligned and to be read, respectively, and a fine scale $S^c$.

In the first ray set, the scale $M^c$ is lit by the lamp $L_1^c$ through the condenser $K_1^c$ and projected by means of the objective $O_1^c$ through the rotatable mirror $V^c$ and the immovable mirrors $Sp_7^c$ and $Sp_8^c$ onto the immovable screen $W^c$, which is equipped with an alignment mark $G_1^c$ for the images $T^1_c$ of the scale lines $T_c$ of the scale $M^c$. In the second ray set, which in this embodiment is disposed immovable relative to the scanning point of the first ray set, the fine scale $S^c$ is lit by means of the lamp $L_2^c$ through the condenser $K_2^c$ and projected by means of the objective $O_2^c$ over the mirrors $Sp_9^c$ and $Sp_{10}^c$ onto the screen $W^c$ which is likewise immovable relative to the scanning point on the scale $M^c$, the screen $W^c$ being equipped with a second alignment mark $G_2^c$ for the images $F^1_c$ of the scale line $F_c$ of the fine scale $S^c$. The fine scale $S^c$ is rigidly connected with the deviation mirror $V^c$ and is disposed concentrically to the rotating axis of the deviation mirror $V^c$, while the plane of the fine scale $S^c$ is arranged perpendicular to the rotating axis of the deviation mirror $V^c$, which rotating axis in turn is parallel to the plane of the scale lines of the scale $M^c$. The circular length of the fine scale $S^c$ is of such measurement, that its starting and end point coincides with the optical axis of the second ray set, when successively two images $T^1_c$ of two successive scale lines $T_c$ of the scale $M^c$ are aligned in the center of the alignment mark $G_1^c$ by rotation of the mirror $V^c$.

The reflecting face of the deviation mirror $V^c$ must be adjusted to a position wherein the reflecting face runs through the rotating axis of the mirror which axis is parallel with the scale lines of the scale $M^c$ and which axis runs through the rearward focus point of the objective $O_1^c$. The reflecting range of the surface of the deviation mirror $V^c$ is limited to an elliptically shaped zone which is disposed symmetrically to the optical axis of the first ray set, which elliptically shaped zone is surrounded by a possibly weakly reflecting second zone, in such a manner that the elliptically shaped zone operates as a blind for the first ray set.

In this manner, the deviation mirror $V^c$ becomes the existing pupil of the objective $O_1^c$, when the reflecting range is smaller than the difference between the opening of the objective and the image range, so that the first ray set is subjected merely to changes of direction during its continued run independently from the position of the scale line of the scale $M^c$ during rotation of the deviation mirror $V^c$, and the lateral displacements of the second ray set, which are experienced without this expedient, are avoided. As to the intervals and the numbering of the fine scale $S^c$ and of the scale $M^c$, reference is made to the disclosure in connection with FIG. 1.

The alignment of the position and the reading, respectively, of a scale line of the scale $M^c$ takes place in the following manner:

The deviation mirror $V^c$ is turned upon its axis, which is parallel to the scale lines to be read until the image $T^1_c$ of the scale line $T_c$ lies in the center of the alignment mark $G_1^c$ on the screen $W^c$. The images $Z^1_c$ of the numbers $Z_c$ of the scale $M^c$ and the images $D^1_c$ of the numbers $D_c$ of the fine scale $S^c$ render the desired reading value. As to the arrangement of the number images $Z^1_c$ and $D^1_c$, reference is made again to the disclosure in connection with FIG. 1.

The alignment of the device disclosed in FIG. 7 to a predetermined value follows the alignment of the device in accordance with FIG. 1.

A rotatable glass plate having parallel opposite faces can also be used as a deviating element for the first ray set. In this case, the first ray set is set off parallel to itself during its continued run and the division of the fine scale $S^c$ must be made in a non-linear manner.

The scale lines of the fine scale $S$ may be omitted in all embodiments of the present invention and the fine scale $S$ may be equipped exclusively with numbers, if the slight loss of accuracy caused thereby during the alignment of the device is acceptable. In this case the position of the images of the numbers of the fine scale $S$ during alignment and reading is related to the alignment mark $G_1$ for the scale line images of the scale $M$.

The dotted portions, in FIGS. 1, 5 and 7, of the scale $M$, $M^a$, $M^c$ and of the scale $S$, $S^a$, $S^c$ constitute opaque and non-reflecting surfaces, respectively. By this arrangement, it is brought about that the images of the scale $M$ do not receive any light from the second ray set and, vice versa, the images of the fine scale $S$ do not receive any light from the first ray set on the screen $W$.

It is to be understood that in all embodiments of the present invention the scanning of the scale $M$ and the scanning of the scale $S$ may be performed in reflected light. Furthermore, it is also possible to equip the screens with reading-glasses and -lenses, respectively. The scale lines of the scale $M$ and of the scale $S$ may be in the shape of part marks, which deviate from the conventional rectangular shape of the known scale lines.

Figure 8:
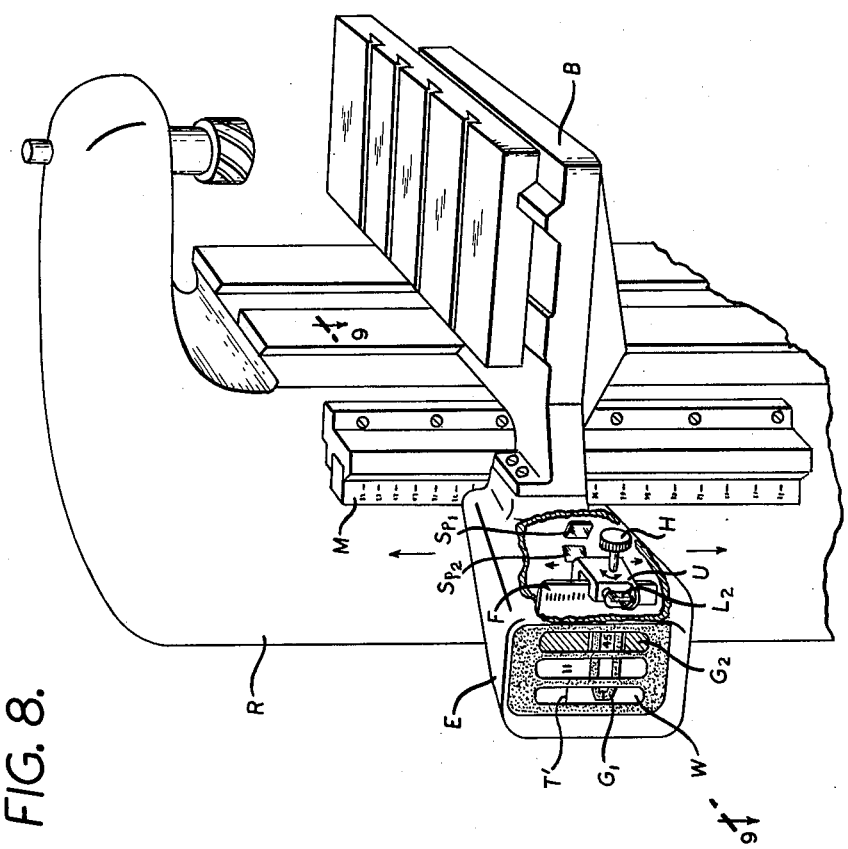
FIG. 8 is a front perspective view of a shaping machine wherein the device of FIG. 6 is incorporated.
Figure 9:
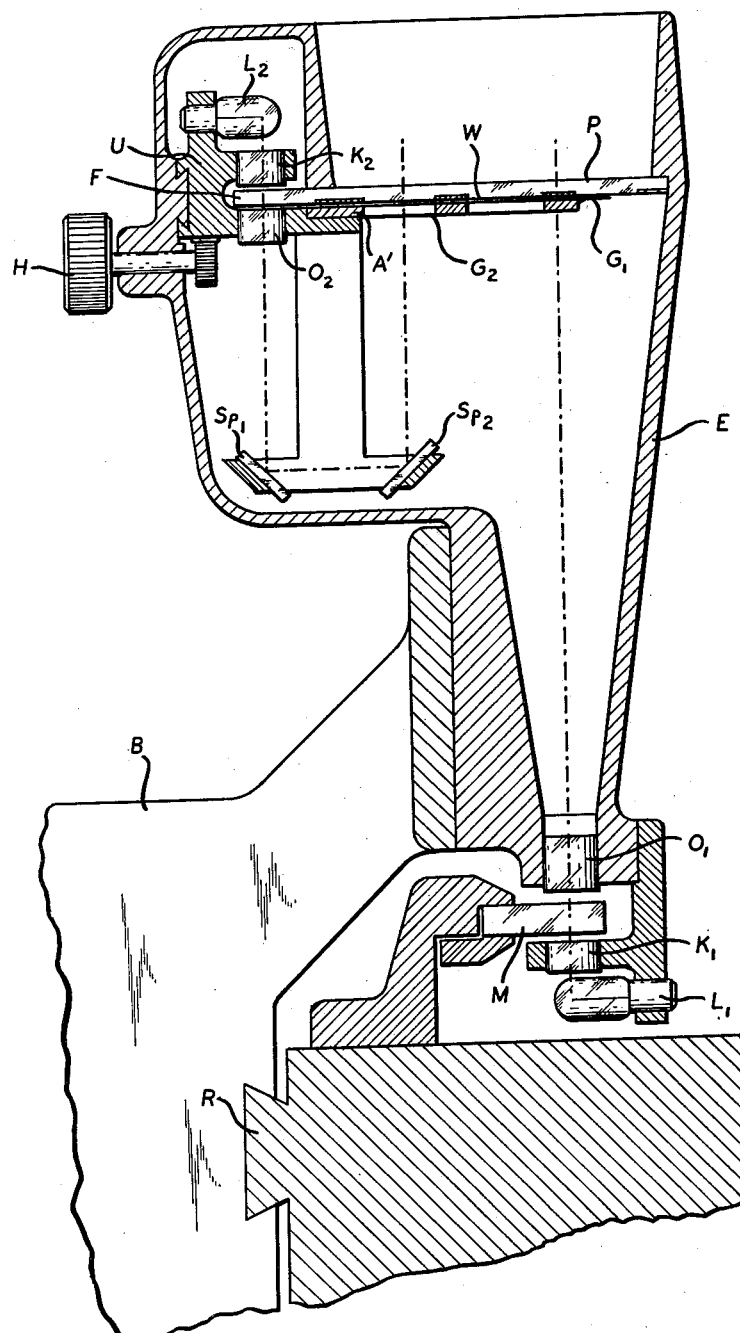
FIG. 9 is a horizontal fragmentary section of the machine shown in FIG. 8.

Referring now to FIGS. 8 and 9 of the drawings, an application of the device, shown in FIG. 6, is disclosed with a shaping machine.

As clearly shown in FIG. 8, the present device E is rigidly connected with the table B of the shaping machine and serves the purpose of alignment and reading of the light-ordinates of the table by means of the measure M rigidly mounted on the machine housing R. The image $T^1$ of a scale line of the measure M appears on the screen W and the number 11 as the corresponding number of the said scale line. The screen W shows also the number 45 of the fine scale F. The alignment mark $G_1$ is formed like pliers, while the alignment mark $G_2$ is formed as a frame, which indicates the numbers of the fine scale F. A rotating knob H moves the carrier U, as is best shown in FIG. 9, and the respective ranges of the fine scale F are thus projected onto the screen W. FIG. 9 indicates the details of the attachment of the device to the shaping machine shown in FIG. 8. The members M, $K_1$, $O_1$, $L_1$, $G_1$, $G_2$, $O_2$, A, W, $K_2$, $L_2$, $Sp_1$ and $Sp_2$ correspond with the same members disclosed above in connection with the description of FIG. 6. The device E is rigidly connected with the table B, as shown in FIG. 8, while the measure M is rigidly mounted on the housing or frame R. The carrier U is moved by operation of the knob H by which the members $L_2$, $K_2$, $O_2$, $Sp_1$, $Sp_2$, A, $G_1$ and $G_2$ of FIG. 6 are joined to a single rigid unit. Contrary, however, to the arrangement of FIG. 6, the lamp $L_2$ is not immovably mounted, but is movably mounted by rigid connection with the carrier U, whereby the condenser $K_0$ is omitted. Furthermore, contrary to the arrangement in FIG. 6, the glass plate A is replaced by a metal plate $A^1$ which has corresponding openings and is not disposed above, but below the screen W, which is formed by an opaque zone provided on the bottom face of the glass plate P.

The alignment marks $G_1$ and $G_2$ are formed by a template of sheet metal, which is rigidly connected with the metal plate $A^1$.

In order to provide summarily an indication which of the elements are movable as a unit relative to the main scale and to another group of said elements in all embodiments, a table is now presented, defining each of the groups of elements forming a unitary structure, as was clearly ascertained from the detailed description of each of the embodiments:

STRUCTURE UNITS

|  | I | II | |
|---|---|---|---|
|  |  | 1 | 2 |
| Fig. 1 | M | $L_1$, $K_1$, $O_1$, $Sp_1$, $L_2$, $K_2$, $O_2$ | W, P, $G_1$, $G_2$, S, $Sp_2$, $O_3$ |
| Fig. 4 | M | $O_1$, $K_{12}$, $Sp_4$, $Sp_3$, $K_{11}$, $L_{12}$, $K_{21}$, $Sp_5$ | $Sp_6$, $K_{22}$, $O_2$ |
| Fig. 5 | $M^a$ | $L_1{}^a$, $K_1{}^a$, $O_1{}^a$, $L_2{}^a$, $K_0{}^a$, $S^a$ | $W_a$, $G_1{}^a$, $Sp_2{}^a$, $Sp_1{}^a$, $O_2{}^a$, $K_2{}^a$, $Sp_0{}^a$ |
| Fig. 6 | $M^b$ | $L_1{}^b$, $K_1{}^b$, $O_1{}^b$, $L_2{}^b$, $K_0{}^b$, $P^b$, $S^b$ | $A^b$, $G_1{}^b$, $G_2{}^b$, $Sp_2{}^b$, $Sp_1{}^b$, $O_2{}^b$, $K_2{}^b$, $SP_0$ |
| Fig. 7 | $M^c$ | $L_1{}^c$, $K_1{}^c$, $O_1{}^c$, $Sp_7{}^c$, $Sp_8{}^c$, $W^c$, $G_7{}^c$, $G_2{}^c$, $L_2{}^c$, $K_2{}^c$, $O_2{}^c$, $Sp_9{}^c$, $Sp_{10}{}^c$ | $S^c$, $V^c$ |
| Figs. 8 and 9 | M, R | B, E, $L_1$, $K_1$, $O_1$, P, W, F | U, $L_2$, $K_2$, $O_2$, $Sp_1$, $Sp_2$, $A'$, $G_1$, $G_2$ |

As may be readily ascertained from the above detailed description of the respective embodiments the operation differs, depending upon (a) whether it is to be measured what the position of the main scale M (structure unit I) is with respect to the structure unit II and, to be more precise, with respect to the structure unit $II_1$, or (b) whether a predetermined, previously numerically set position of the main scale M (structure unit I) is to be aligned with respect to the structure unit II, or more precisely with respect to the structure unit $II_2$.

In the case of the operation (a) the main scale M (structure unit I) and the total structure unit II assume already a certain position with respect to each other, which position is to be determined and to be read, respectively. In this case it is merely necessary to move the structure unit $II_2$ relative to the non-moving structure unit $II_1$ until the image $T^1$ of the scale line T of the main scale M is disposed between the alignment marker $G_1$, whereupon the relative position may be read without any difficulty.

In the case of the operation (b) where at first a predetermined relative position is to be set, at first the structure unit $II_2$ is moved relative to the non-moving structure unit $II_1$ until the desired numerical value of the fine scale S is shown in proper alignment with the alignment marker $G_2$. Then the relative position between the main scale (structure unit I) and the total structure unit II is changed, until the image of the desired scale line of the main scale is in proper register with the alignment marker $G_1$. Thus, the desired relative position is achieved.

While I have disclosed several embodiments of the present invention, it is to be understood that these embodiments are given by example only and not in a limiting sense, the scope of the present invention being determined by the objects and the claims.

I claim:

1. A device for the alignment and reading of distances and angles, comprising
   a first carrier carrying a main scale,
   a second carrier carrying a fine scale and disposed in a plane parallel to and spaced apart from the plane defined by said main carrier,
   said fine scale corresponding with one interval of said main scale,
   said scales having scale lines and consecutive numbers aligned therewith,
   a screen disposed parallel to and spaced apart from said carriers,
   an optical system including a light source and a lens coordinated to each of said scales and projecting onto said screen enlarged images of said respective scales and including means for disposing said images of said main scale and of said images of said fine scale in adjacent positions, thereby aligning respective consecutive numbers to form a continuous number,
   means for mounting said carriers for parallel movement relative to each other,
   means providing relative movement between said carriers of said scales for a length equal with the full length of said scale, and
   the length of said fine scale being not larger than the length of said image of one interval of said main scale on said screen, in order to divide said image of said interval of said main scale.

2. The device, as set forth in claim 1, which includes an alignment mark within the image field of said fine scale on said screen, said alignment mark locating the correct position of the image of said numbers of said fine scale.

3. The device, as set forth in claim 1, wherein said second carrier comprises a transparent plate carrying said fine scale, said plate having an opaque longitudinal zone adjacent said fine scale, said opaque zone constituting said screen and carrying a first alignment mark for locating the image of said main scale and a second alignment mark for locating the image of said fine scale and said fine scale being disposed on the opposite face of said glass plate.

References Cited in the file of this patent

UNITED STATES PATENTS

| 2,355,910 | Gallasch | Aug. 15, 1944 |
| 2,566,875 | Dietrich et al. | Sept. 4, 1951 |
| 2,584,075 | Wilson | Jan. 29, 1952 |
| 2,933,013 | Baker et al. | Apr. 19, 1960 |

FOREIGN PATENTS

| 1,001,008 | Germany | Jan. 17, 1957 |

OTHER REFERENCES

Merritt: "The MM 100 Optical Comparator," Photogrammetric Engineering, vol. XXI, No. 1, March 1955, pages 56–60.